United States Patent
Hodges et al.

(10) Patent No.: US 11,164,469 B2
(45) Date of Patent: Nov. 2, 2021

(54) METHOD AND SYSTEM FOR AIDING IN THE PILOTING OF AN AIRCRAFT

(71) Applicant: Airbus Operations SAS, Toulouse (FR)

(72) Inventors: Colin Hodges, Frampton Cotterell (GB); Elodie Saby, Toulouse (FR); Philippe Toulemonde, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 288 days.

(21) Appl. No.: 16/356,118

(22) Filed: Mar. 18, 2019

(65) Prior Publication Data
US 2019/0304315 A1 Oct. 3, 2019

(30) Foreign Application Priority Data
Mar. 28, 2018 (FR) ...................................... 1852665

(51) Int. Cl.
| | |
|---|---|
| G08G 5/02 | (2006.01) |
| B64D 45/08 | (2006.01) |
| G08G 5/00 | (2006.01) |
| G05D 1/06 | (2006.01) |
| B64D 45/04 | (2006.01) |

(52) U.S. Cl.
CPC ............. G08G 5/025 (2013.01); B64D 45/04 (2013.01); B64D 45/08 (2013.01); G05D 1/0676 (2013.01); G08G 5/0021 (2013.01)

(58) Field of Classification Search
CPC .... G08G 5/025; G08G 5/0021; G05D 1/0676; B64D 45/04; B64D 45/08
See application file for complete search history.

(56) References Cited

U.S. PATENT DOCUMENTS

| | | |
|---|---|---|
| 2008/0140272 A1 | 6/2008 | Zadrozynski et al. |
| 2010/0036551 A1 | 2/2010 | Lacaze et al. |
| 2015/0276428 A1 | 10/2015 | Constans et al. |

FOREIGN PATENT DOCUMENTS

| | | |
|---|---|---|
| FR | 2885439 A1 | 11/2006 |
| FR | 2908220 A1 | 5/2008 |

OTHER PUBLICATIONS

French Search Report; priority document.

*Primary Examiner* — Anne Marie Antonucci
(74) *Attorney, Agent, or Firm* — Greer, Burns & Crain, Ltd.

(57) ABSTRACT

A method for aiding in the piloting of an aircraft landing on a runway comprises determining current flight conditions of the aircraft, determining a first approach distance using the current flight conditions, determining a current aircraft position and selection of a first point on a cockpit screen that is a function of the current position of the aircraft, selecting a second point in proximity to the landing runway, and controlling the display on the cockpit screen, of a first circular arc centered on the second point and whose radius is a function of the first approach distance, the first circular arc intersecting at a third point with a straight line passing through the first point and through the second point and the length of a part of the first circular arc situated between the third point and a first end of the first circular arc, comprising a predetermined length.

14 Claims, 6 Drawing Sheets

PRIOR ART

METHOD AND SYSTEM FOR AIDING IN THE PILOTING OF AN AIRCRAFT

CROSS-REFERENCES TO RELATED APPLICATIONS

This application claims the benefit of the French patent application No. 1852665 filed on Mar. 28, 2018, the entire disclosures of which are incorporated herein by way of reference.

BACKGROUND OF THE INVENTION

The present invention relates to a method and a system for aiding in the piloting of an aircraft in an operational flight phase during which the aircraft is likely to land on a landing runway. Such an operational flight phase can in particular correspond to an approach phase for a landing on a landing runway. To have an aircraft, in particular a transport airplane, land on a landing runway, with this aircraft flying at a current instant with a current energy, it is necessary to manage the dissipation of its energy in the approach to the landing runway so that, on the one hand, the contact of the aircraft with the ground is not too abrupt and, on the other hand, once the aircraft is on the ground, it has a sufficient braking capacity to stop before an end of the landing runway. For that, the landing procedures stipulate that the aircraft must be in a state called "stabilized state" when it reaches, in descent, a so-called stabilization point which has a corresponding predetermined height relative to the ground, defined in the landing procedure chosen by the pilot. The predetermined height can for example be 1000 feet (approximately 300 meters) or 500 feet (approximately 150 meters). The stabilized state corresponds to stabilized approach conditions, which comprise, in particular, an approach speed and an approach slope that are predetermined and stabilized (that is to say, constant in time) defined in the landing procedure considered. These stabilized approach conditions must be maintained for the rest of the approach to the landing runway, to a height, for example, of 50 feet (approximately 15 meters) in direct proximity to the landing runway. The energy of the aircraft at a given instant corresponds to the sum, on the one hand, of its potential energy, by virtue of the height difference between the position of the aircraft at that instant and the position of the landing runway, and, on the other hand, of its kinetic energy at that instant.

Figure 1:
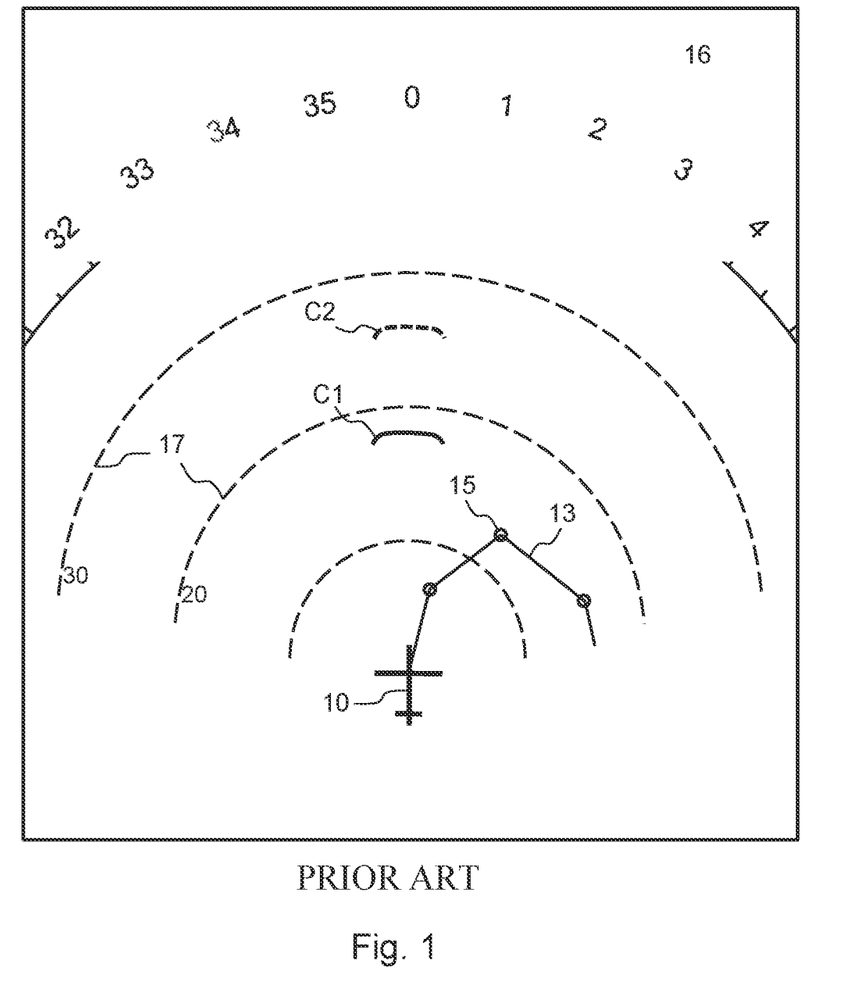
FIG. 1, already described, represents a display on a navigation screen of an aircraft, according to the prior art.

When a pilot of the aircraft wants to fly such an operational phase during which the aircraft is likely to land on a landing runway, it is desirable for him or her to have indicators in the cockpit of the aircraft enabling him or her to assess whether it is possible to have the aircraft land in good condition on this landing runway. In particular, it is desirable for these indicators to enable the pilot to assess whether it is possible to manage a dissipation of the current energy of the aircraft in its approach to the landing runway that makes it possible to achieve a stabilized state at the predetermined height, so that, on the one hand, the contact of the aircraft with the ground is not too abrupt and, on the other hand, once the aircraft is on the ground, it has a sufficient braking capacity to stop before an end of the landing runway. The documents FR2885439 and FR2908220 describe the display of a first and of a second circular arc on a navigation screen of the cockpit, these two circular arcs corresponding, respectively, for the first to a minimum approach distance in accordance with an optimized approach for achieving stabilized approach conditions and for the second to a standard approach distance in accordance with a standard approach for achieving stabilized approach conditions, each of the distances being defined between projections in a horizontal plane of a current position of the aircraft and of a position of contact of the aircraft with the ground. Throughout the description, the term "optimized approach" means that the minimum approach distance in accordance with an optimized approach corresponds to a strategy of maximum dissipation of the energy of the aircraft, and therefore to a maximum deceleration of the aircraft in light of its operational performance levels, in particular by applying a management of the aerodynamic configuration (air brakes, etc.) of the aircraft. The two circular arcs allow the pilot to better assess the capacity of the aircraft to land in good conditions on the landing runway, by comparing the positions of the circular arcs with a position of the landing runway represented on the navigation screen. However, the display of the circular arcs on the navigation screen depends on the display range selected by the pilot for the display of the navigation screen. If the display range selected by the pilot is not sufficient, these circular arcs may not be displayed on the screen and the pilot is not then informed of the capacity of the aircraft to land in good conditions on the landing runway. Also, when the navigation screen is configured in ARC mode and the landing runway is situated behind the aircraft, the position of the landing runway is not displayed on the navigation screen. Even if the two circular arcs are displayed, they do not enable the pilot to assess the capacity of the aircraft to land in good conditions on the landing runway since the latter is not represented on the screen. Such a situation is represented in FIG. 1. This figure represents a navigation screen of ND (navigation display) type on which are normally displayed:

- a symbol 10 representing the current position of the aircraft;
- a standard distance gradation 17, defined relative to the current position of the aircraft illustrated by the symbol 10;
- a standard angular deviation gradation 16;
- a plot 13 illustrating the theoretical flight trajectory of the aircraft as a projection in the horizontal plane, with waypoints 15.

This screen also shows, in front of the aircraft, the first circular arc C1 associated with the minimum approach distance and the second circular arc C2 associated with the standard approach distance. In the example illustrated in the figure, the landing runway is situated behind the aircraft and is not consequently visible on the navigation screen. It is therefore difficult for the pilot to interpret the display of the two circular arcs C1 and C2.

SUMMARY OF THE INVENTION

An object of the present invention is to remedy the abovementioned drawbacks. It relates to a method for assisting in the piloting of an aircraft in an operational flight phase during which the aircraft is likely to land on a landing runway, a method whereby the following successive steps are performed automatically and repetitively:

a) determination of current flight conditions of the aircraft by an information acquisition device;

b) determination, by a processing unit, at least using the current flight conditions, of a first approach distance chosen from the following approach distances which correspond to distances in a horizontal plane between projections in this horizontal plane of the current position of the aircraft and a position of contact with the ground:

b1) a minimum approach distance in accordance with an optimized approach for achieving stabilized approach conditions;

b2) a standard approach distance in accordance with a standard approach for achieving stabilized approach conditions; and c) control, by a display management computer, of the display, on a screen of the cockpit of the aircraft, of a first symbol associated with the first approach distance.

This method is noteworthy in that the step c) comprises the following substeps:

c1) determination of a current position of the aircraft and selection of a first point, on the screen of the cockpit, that is a function of the current position of the aircraft;

c2) selection of a second point in proximity to the landing runway; and c3) control of the display, on the screen of the cockpit, of a first circular arc centered on the second point and whose radius is a function of the first approach distance, this first circular arc being such that, on the one hand, it intersects, at a third point, a straight line passing through the first point and through the second point and, on the other hand, the length displayed on the screen of a part of the first circular arc situated between the third point and a first end of the first circular arc corresponds to a predetermined length, the first circular arc corresponding to the first symbol.

According to this method, the first circular arc (corresponding to the first symbol associated with an approach distance out of the minimum approach distance and the standard approach distance) intersects the straight line passing on the one hand, through the first point situated in proximity to the current position of the aircraft and, on the other hand, through the second point situated in proximity to the landing runway. Thus, whatever the circumstances, when the aircraft approaches the landing runway, there is necessarily an instant from which the first circular arc is displayed on the screen, regardless of display scale (range) selected for this screen. In fact, there is necessarily an initial situation for which the energy of the aircraft is such that it can land on the landing runway. For such an initial situation, a symbol corresponding to the aircraft is situated outside of the first circular arc. By considering that there is also an instant during the approach to the landing runway from which a symbol corresponding to the landing runway is visible on the screen, it being given that the first circular arc intersects the straight line passing, on the one hand, through the first point situated in proximity to the current position of the aircraft and, on the other hand, through the second point situated in proximity to the landing runway, the result thereof is that the first circular arc is then necessarily displayed on the screen at at least one instant during the approach to the landing runway. Furthermore, as long as the aircraft is at a distance from the landing runway greater than the first distance, the first circular arc intersects a straight line trajectory between the aircraft and the landing runway, which facilitates the understanding by a pilot of the aircraft of the capacity of the aircraft to land on the landing runway: as long as a symbol corresponding to the aircraft is outside of the first circular arc, the energy of the aircraft is such that it can land on the landing runway.

According to a particular embodiment:

the step b) also comprises the determination, by the processing unit, of a second approach distance, the first approach distance corresponding to the standard approach distance and the second approach distance corresponding to the minimum approach distance;

the step c) comprises the control of the display, on the screen of the cockpit, of a second symbol associated with the second approach distance; and the substep c3) comprises the control of the display, on the screen of the cockpit, of a second circular arc centered on the second point and whose radius is a function of the second approach distance, this second circular arc being such that, on the one hand, it intersects the straight line passing through the first point and through the second point and, on the other hand, a first end of the second circular arc is aligned with the second point and with the first end of the first circular arc and a second end of the second circular arc is aligned with the second point and with a second end of the first circular arc, the second circular arc corresponding to the second symbol.

In particular, the first point corresponds:

to the current position of the aircraft; or to the orthogonal projection of the current position of the aircraft on a straight line passing through a longitudinal axis of the landing runway.

More particularly, the second point is chosen from:

a point of stabilization of the aircraft defined for an approach to the landing runway;

a point of start of final approach to the landing runway; and a threshold of the landing runway.

According to an embodiment, the display management computer controls the display of the first circular arc in such a way that the length displayed on the screen of another part of the first circular arc situated between the third point and a second end of the first circular arc, opposite the first end, corresponds also to the predetermined length.

Advantageously, when a distance between the current position of the aircraft determined in the substep c1) and the second point is less than the first approach distance:

the substep c2) also comprises the determination of a fourth point defined in front of the aircraft and corresponding to the intersection of a current heading of the aircraft and of a circle centered on the second point, this circle having for radius the radius that is a function of the first approach distance; and in the substep c3), the display management computer controls the display of the first circular arc in such a way that it intersects a straight line passing through the second point and through the fourth point.

In particular, in the substep c3), the display management computer controls the display of the first circular arc in such a way that the length displayed on the screen of a part of the first circular arc situated between the fourth point and a second end of the first circular arc, opposite the first end, corresponds to the predetermined length.

More advantageously, when the angle at the center of the first circular arc is greater than a predetermined angular value, the substep c3) also comprises:

the modification of the second point selected in the substep c2), by translation of the second point along a straight line parallel to the longitudinal axis of the landing runway, over a translation distance in the landing direction planned for the aircraft on the landing runway; and the display of the first circular arc centered on the duly modified second point, the radius of the first circular arc corresponding to the radius that is a function of the first approach distance, augmented by the translation distance, the translation distance being determined in such a way that the angle at the center of the duly displayed first circular arc is less than or equal to the predetermined angular value.

The invention also relates to a system for aiding in the piloting of an aircraft in an operational flight phase during which the aircraft is likely to land on a landing runway, this system comprising:
an information acquisition device configured to determine current flight conditions of the aircraft;
a processing unit of the aircraft configured to determine, at least using the current flight conditions, a first approach distance chosen from the following approach distances which correspond to distances in a horizontal plane between projections in this horizontal plane of the current position of the aircraft and of a position of contact with the ground:
a minimum approach distance in accordance with an optimized approach for achieving stabilized approach conditions;
a standard approach distance in accordance with a standard approach for achieving the stabilized approach conditions; and
a display management computer configured to control the display, on a screen of the cockpit of the aircraft, of a first symbol associated with the first approach distance.

This system is noteworthy in that the processing unit and/or the display management computer are configured to:
determine a current position of the aircraft and select a first point, on the screen of the cockpit, that is a function of the current position of the aircraft; and
select a second point in proximity to the landing runway, and in that the display management computer is configured to control the display, on the screen of the cockpit, of a first circular arc centered on the second point and whose radius is a function of the first approach distance, this first circular arc being such that, on the one hand, it intersects, at a third point, a straight line passing through the first point and through the second point and, on the other hand, the length displayed on the screen of a part of the first circular arc situated between the third point and a first end of the first circular arc corresponds to a predetermined length, the first circular arc corresponding to the first symbol.

According to a particular embodiment:
the processing unit is also configured to determine a second approach distance, the first approach distance corresponding to the standard approach distance and the second approach distance corresponding to the minimum approach distance; and
the display management computer is also configured to control the display, on the screen of the cockpit, of a second symbol associated with the second approach distance, this second symbol corresponding to a second circular arc centered on the second point and whose radius is a function of the second approach distance, this second circular arc being such that, on the one hand, it intersects the straight line passing through the first point and through the second point and, on the other hand, a first end of the second circular arc is aligned with the second point and with the first end of the first circular arc and a second end of the second circular arc is aligned with the second point and with a second end of the first circular arc.

In one embodiment, the display management computer is configured to control the display of the first circular arc in such a way that the length displayed on the screen of another part of the first circular arc situated between the third point and a second end of the first circular arc, opposite the first end, corresponds also to the predetermined length.

Advantageously:
the processing unit is also configured to determine whether a distance between the current position of the aircraft and the second point is less than the first approach distance and, if such is the case, to determine a fourth point defined in front of the aircraft and corresponding to the intersection of a current heading of the aircraft and of a circle centered on the second point, this circle having for radius the radius that is a function of the first approach distance; and
the display management computer is configured to, in such a case, control the display of the first circular arc in such a way that it intersects a straight line passing through the second point and through the fourth point.

More advantageously, the display management computer is configured to determine whether the angle at the center of the first circular arc is greater than a predetermined angular value and, in such a case:
modify the second point, by translation of the second point along a straight line parallel to the longitudinal axis of the landing runway, over a translation distance in the landing direction planned for the aircraft on the landing runway; and
control the display of the first circular arc centered on the duly modified second point, the radius of the first circular arc corresponding to the radius that is a function of the first approach distance, augmented by the translation distance,
the translation distance being determined in such a way that the angle at the center of the duly displayed first circular arc is less than or equal to the predetermined angular value.

The invention relates also to an aircraft comprising a piloting aid system as cited above.

BRIEF DESCRIPTION OF THE DRAWINGS

The invention will be better understood on reading the following description and on studying the attached figures.

DETAILED DESCRIPTION OF THE PREFERRED EMBODIMENTS

Figure 2:
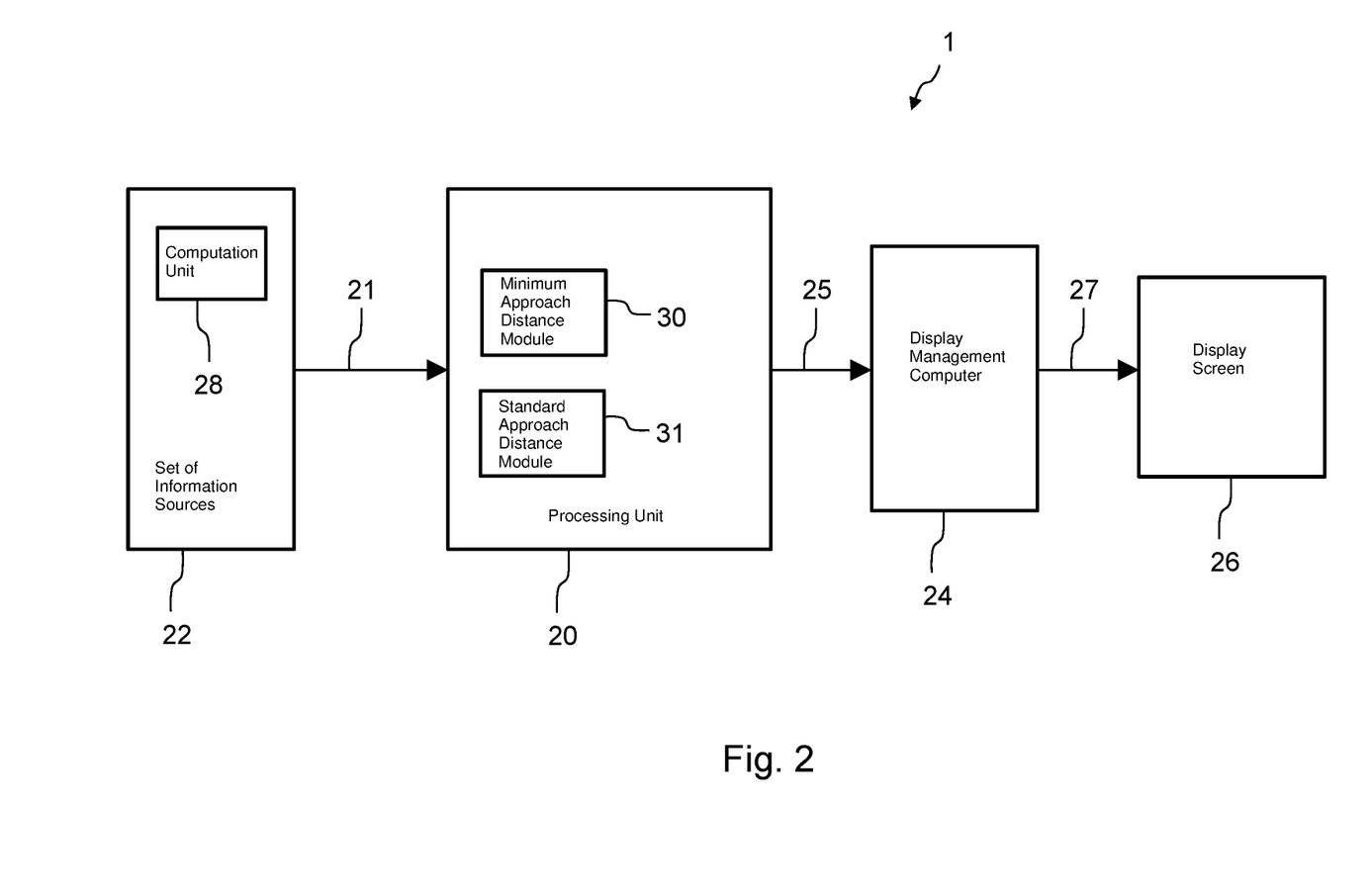
FIG. 2 schematically represents a system for aiding in the piloting of an aircraft according to an embodiment of the invention.
Figure 6:
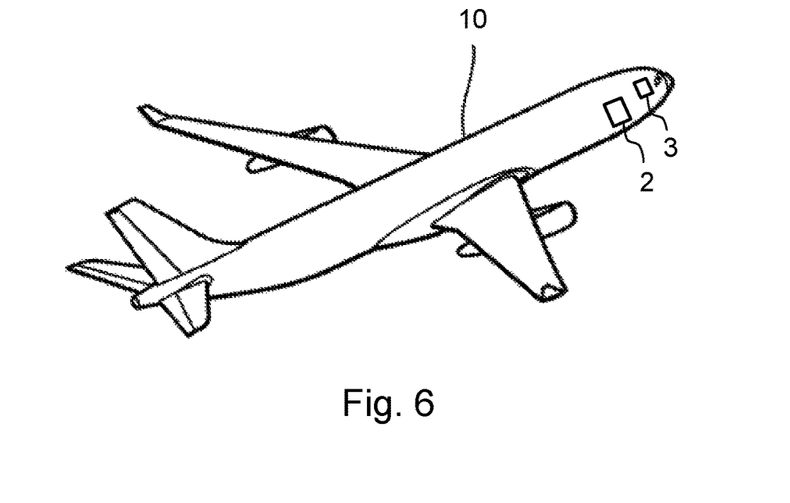
FIG. 6 illustrates, in a simplified manner, an aircraft comprising a cockpit.

The piloting aid system 1, as represented in FIG. 2, comprises a set 22 of information sources, a processing unit 20 linked to the set 22 of information sources by a link 21, a display management computer 24 linked to the processing unit 20 by a link 25 and a display screen 26 linked to the display management computer 24 by a link 27. The piloting aid system 1 is installed on board an aircraft 10 such as that represented in FIG. 6. For example, the processing unit 20 and the display management computer 24 are installed in an avionics bay 2 of the aircraft. The display screen 26 is a screen of a cockpit 3 of the aircraft. The processing unit 20 comprises a module 30 for computing a minimum approach distance and a module 31 for computing a standard approach distance. In a nonlimiting particular embodiment of the invention:

the processing unit 20 corresponds to a flight management computer of FMS (Flight Management System) type and the computation modules 30 and 31 are implemented in the form of software functions of the flight management computer;

the display management computer 24 is a computer linked to a display system of the cockpit of the aircraft, for example of CDS (Cockpit Display System) type; and the screen 26 is a navigation screen of ND (Navigation Display) type of the display system of the cockpit.

The display management computer 24 corresponds, for example, to the flight management computer of FMS type, an aircraft guidance computer of FG (Flight Guidance) type or to a modular avionics computer, for example of IMA (Integrated Modular Avionics) type.

Alternatively, without departing from the scope of the invention, the computation modules 30 and 31 can be implemented outside the flight management computer of FMS type. For example, these computation modules can be implemented in the form of software functions of a guidance computer of the aircraft of FG (Flight Guidance computer) type or of a modular avionics computer of IMA (Integrated Modular Avionics) type.

The set 22 of information sources comprises a computation unit 28 configured to determine, in particular to measure or estimate, in the normal manner current flight conditions of the aircraft. These current flight conditions of the aircraft comprise at least the height of the aircraft relative to the ground, the speed of the aircraft and the aerodynamic configuration of the aircraft (in particular the position of slats and flaps). The information sources can for example comprise inertial measurement means of IRS (Inertial Reference System) type, satellite location means of GNSS (Global Navigation Satellite System) type, for example of GPS type, radio altimeters, etc. The set 22 of information sources and the computation unit 28 form an information acquisition device configured to determine current flight conditions of the aircraft.

In operation, this information acquisition device determines the current flight conditions of the aircraft from information supplied by different sources of information of the set 22 of sources of information and it transmits these current flight conditions of the aircraft to the processing unit 20. In an approach to a landing runway 12, the computation unit 30 of the processing unit determines a minimum approach distance which corresponds to a minimum distance between first and second projections on a horizontal plane, on the one hand, of the current position of the aircraft and, on the other hand, of a position of contact of the aircraft with the ground, when the latter descends and decelerates from its current position, in accordance with an optimized approach for achieving stabilized approach conditions. As indicated previously, this optimized approach corresponds to a maximum deceleration of the aircraft in light of its operational performance levels. The computation module 31 determines a standard approach distance which corresponds to a distance between first and second projections on the horizontal plane, on the one hand, of the current position of the aircraft and, on the other hand, of a position of contact of the aircraft with the ground, when the latter descends and decelerates from its current position, in accordance with a standard approach for achieving the stabilized approach conditions. The determination of the minimum approach distance and of the standard approach distance, respectively by the modules 30 and 31, will not be described more, it being given that they are described in detail in the documents FR2885439 and FR2908220 to which the person skilled in the art will be able to refer, and which are both incorporated herein by reference.

The processing unit 20 transmits the minimum approach distance and the standard approach distance to the display management computer 24. The latter controls the display, on the screen 26, of a first symbol associated with a first approach distance and, advantageously, of a second symbol associated with a second approach distance. When only the first symbol is displayed, the first approach distance corresponds to one or other of the standard approach distance and the minimum approach distance. When the first symbol and the second symbol are displayed, the first approach distance corresponds to the standard approach distance and the second symbol corresponds to the minimum approach distance.

Figure 3:
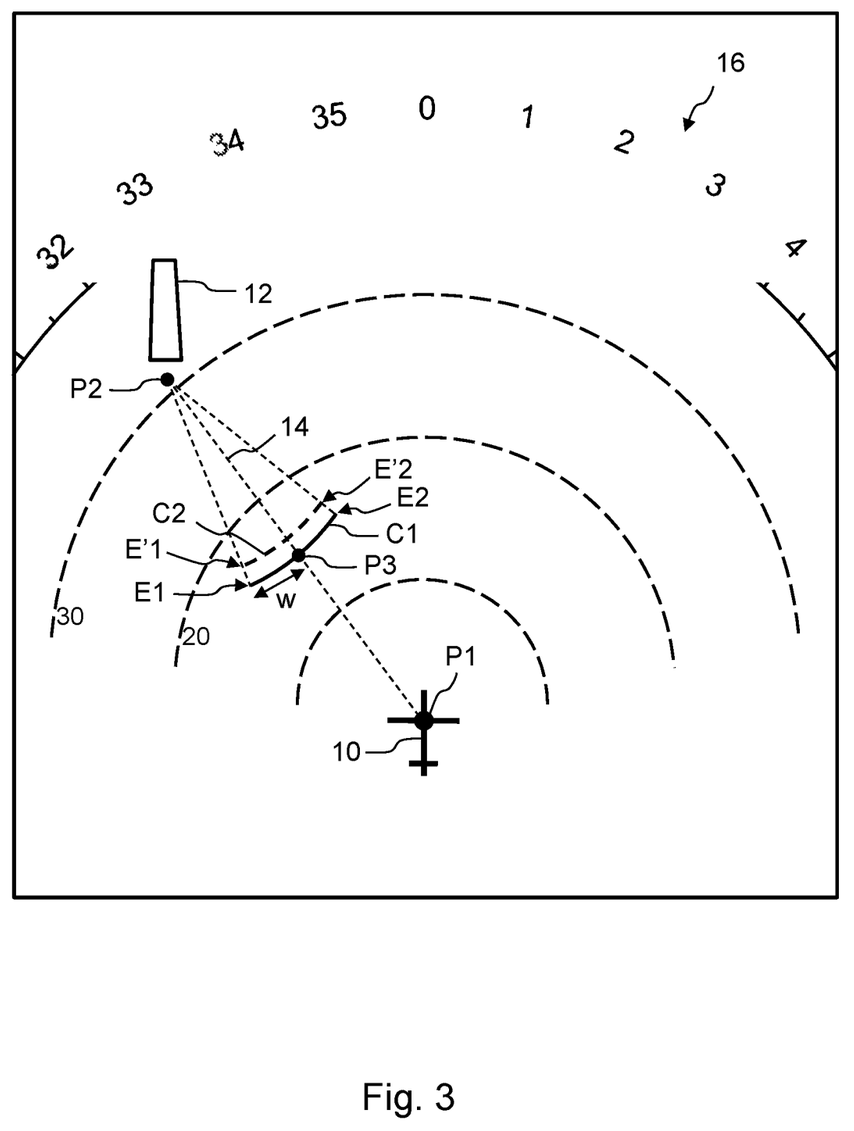
FIGS. 3, 4 and 5 illustrate different displays on a navigation screen of an aircraft, in accordance with an embodiment of the invention.

Depending on the current flight conditions of the aircraft received from the set of sources of information 22, the processing unit 20 determines a current position of the aircraft. In a first variant, the display management computer 24 selects a first point P1 on the screen 26 according to the current position of the aircraft. According to a first alternative, this first point corresponds to the current position of the aircraft, as illustrated in FIG. 3. According to a second alternative, the first point is situated in proximity to the current position of the aircraft. This second alternative is, for example, chosen when the current position of the aircraft is situated, in projection in a horizontal plane, in proximity to a straight line passing through a longitudinal axis of a landing runway 12, the distance between the current position of the aircraft and this straight line being less than a predetermined distance value. In such a case, the first point P1 selected corresponds to the orthogonal projection of the current position of the aircraft on the straight line passing through the longitudinal axis of the landing runway. The screen 26 being a navigation screen of ND type, in a phase of approach to a landing runway 12, the current position of the aircraft is generally represented on the screen 26, for example by means of an aircraft symbol 10. In a second variant, the first point P1 is selected (as indicated previously) by the processing unit 20 which transmits its position to the display management computer 24. The processing unit 20, on the basis of information relating to the selected approach to the landing runway 12, selects a second point P2 situated in proximity to the landing runway. In as much as the processing unit 20 corresponds to a computer of FMS type, this processing unit contains or has access to such information relating to the selected approach. According to a first alternative, this second point corresponds to a point of stabilization of the aircraft defined for the selected approach to the landing runway. According to another alternative, the second point corresponds to a point of start of final approach to the landing runway (called FAF, for "Final Approach Fix"). According to yet another alternative, the second point corresponds to a threshold of the landing runway. The processing unit 20 transmits the position of the second point P2 to the display management computer 24. In a variant, the second point P2 is selected by the display management computer 24. The display management computer determines the position of the second point P2 on the screen 26 or possibly outside of the screen if the runway is not visible on the screen depending on the display scale ("range") selected. The display management computer 24 controls the display on the screen 26, of a first circular arc C1 centered on the second point P2 and intersecting, at a third point P3, a straight line 14 (P1, P2) passing through the first point P1 and through the second point P2. The radius of the first circular arc C1 is a function of the first approach distance. In particular, this radius corresponds to the first approach distance corrected as a function of a distance between the second point P2 and a theoretical point of contact of the aircraft with the ground on the landing runway. This theoretical point of contact of the aircraft with the ground can in particular be chosen as corresponding to a runway threshold of the landing runway 12. In an exemplary embodiment, the radius of the first circular arc C1 is equal to the first approach distance minus the distance between the second point P2 and this runway threshold. The first circular arc corresponds to the abovementioned first symbol. It is such that the length displayed on the screen of a part of the first circular arc situated between the third point P3 and a first end E1 of the first circular arc corresponds to a predetermined length w. This predetermined length is chosen so as to obtain a satisfactory visibility of the first circular arc C1 by a pilot of the aircraft, when it is displayed on the screen 26. This length is, for example, expressed in the form of a number of pixels of the screen or of a distance on the screen between the points P3 and E Alternatively, this length is chosen so as to correspond to a predetermined angle value at the center of the circular arc C1.

Since the circular arc C1 intersects the straight line passing on the one hand through the first point P1 situated in proximity to the current position of the aircraft and on the other hand through the second point P2 situated in proximity to the landing runway, when the aircraft approaches the landing runway, there is necessarily an instant from which the circular arc C1 is displayed on the screen 26, whatever the display scale (range) selected for this screen. Furthermore, as long as the aircraft is at a distance from the landing runway greater than the first distance, the circular arc C1 intersects a straight-line trajectory between the aircraft and the landing runway, which facilitates the comprehension by a pilot of the aircraft of the capacity of the aircraft to land on the landing runway: as long as the symbol 10 corresponding to the aircraft is outside of the circular arc C1, the energy of the aircraft is such that it can land on the landing runway.

Advantageously, as indicated previously, the display management computer 24 also controls the display of the second symbol associated with the second approach distance. This second symbol corresponds to a second circular arc C2, as represented in FIG. 3. The second circular arc C2 is also centered on the second point P2 and its radius is a function of the second approach distance. In particular, this radius corresponds to the second approach distance corrected as a function of a distance between the second point P2 and a theoretical point of contact of the aircraft with the ground on the landing runway. This theoretical point of contact of the aircraft with the ground can, in particular, be chosen as corresponding to a runway threshold of the landing runway 12. In an exemplary embodiment, the radius of the second circular arc C2 is equal to the second approach distance minus the distance between the second point P2 and this runway threshold. The second circular arc is such that, on the one hand, it intersects the straight line (P1, P2) passing through the first point P1 and through the second point P2 and, on the other hand, a first end E'1 of the second circular arc C2 is aligned with the second point P2 and with the first end E1 of the first circular arc C1. Furthermore, a second end E'2 of the second circular arc is aligned with the second point P2 and with a second end E2 of the first circular arc C1. The display of the first circular arc C1, corresponding to the first symbol, and of the second circular arc C2, corresponding to the second symbol, allows the pilot to be informed both of the standard approach distance and of the minimum approach distance.

In an embodiment represented in FIG. 3, called normal mode, the first circular arc C1 is also such that the length displayed on the screen of another part of the first circular arc situated between the third point P3 and a second end E2 of the first circular arc, opposite the first end E1, corresponds also to the predetermined length w. The first circular arc C1 is thus symmetrical relative to the third point P3, on an axis of symmetry corresponding to the straight line (P1, P2). When it is displayed, the second circular arc C2 is also symmetrical relative to the straight line (P1, P2).

Figure 4:
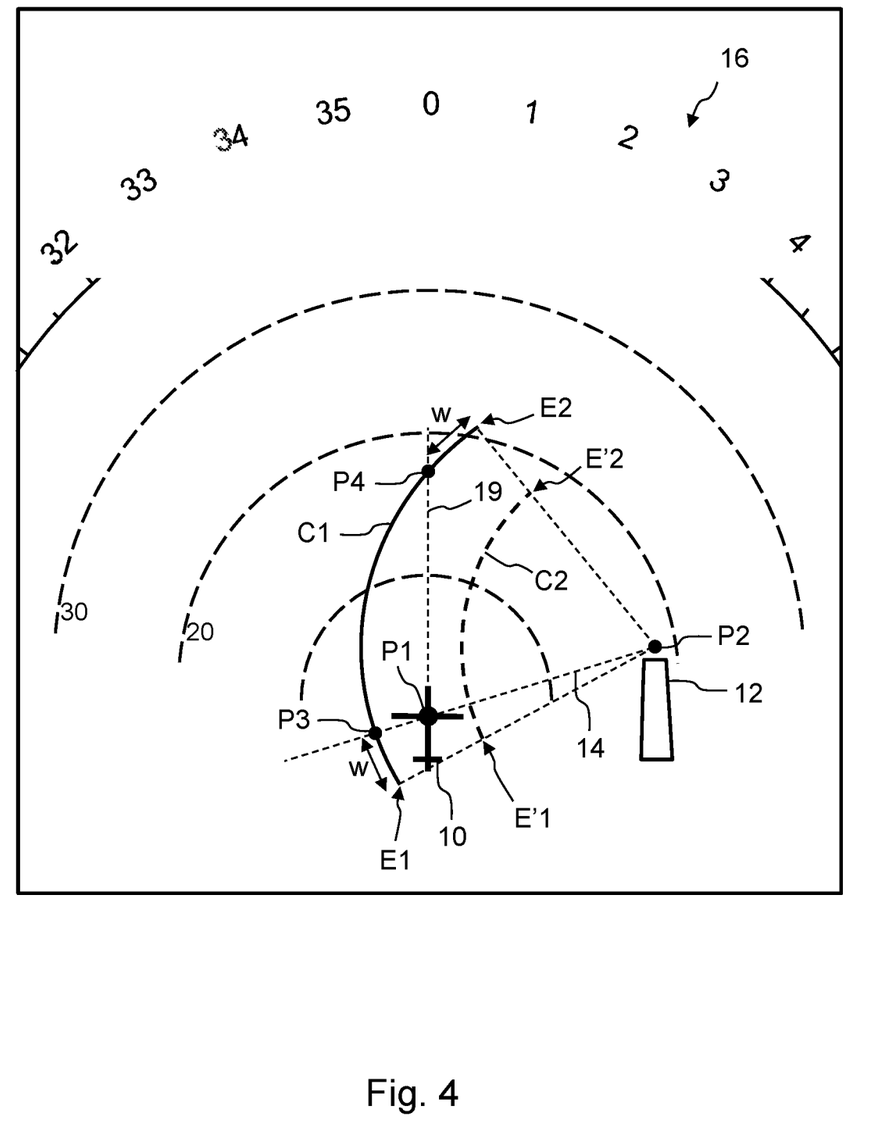

In a particular embodiment represented in FIG. 4, when a distance between the current position of the aircraft 10 and the second point P2 is less than the first approach distance, the display management computer 24 controls the display of the first circular arc C1 according to a so-called extended display mode. Given that the distance between the current position of the aircraft 10 and the second point P2 is less than the first approach distance, the first point P1 situated in proximity to the aircraft 10 is situated between the second point P2 and the third point P3 on the straight line 14. The symbol corresponding to the aircraft 10 is situated inside the first circular arc C1. The first end E1 of the first circular arc C1 is situated on one side of the straight line 14 (P1, P2) such that this side corresponds to a zone of the space situated behind the aircraft in the direction of advance of the aircraft. The display management computer 24 also determines a fourth point P4 defined in front of the aircraft and corresponding to the intersection of a current heading 19 of the aircraft and a circle centered on the second point, this circle having for radius the radius that is a function of the first approach distance (the first circular arc C1 consequently corresponds to a part of the circle). The first circular arc C1 is displayed in such a way that it intersects a straight line (not represented in FIG. 4) passing through the second point P2 and through the fourth point P4. In particular, a part of the first circular arc C1 situated between the fourth point P4 and the second end E2 of the first circular arc, opposite the first end E1, corresponds to the predetermined length w. The display mode corresponding to this particular embodiment is called extended, given that the first circular arc C1 is extended by the length included between the third point P3 and the fourth point P4, compared to the normal display mode. The fact that the first circular arc C1 is extended makes it possible to improve the knowledge of the current situation of the aircraft for a pilot of the aircraft. Indeed, the fourth point P4 corresponds to a point at which the aircraft 10 will exit from the interior of the first circular arc C1 if the pilot maintains the current heading 19 of the aircraft. When the aircraft is outside of the first circular arc C1, its distance relative to the landing runway is greater than the first approach distance and consequently its energy is compatible with a landing on the landing runway 12. That allows the pilot to better assess the trajectory that he or she must fly to land on the landing runway 12. When the second circular arc C2 is displayed, as indicated previously, the display management computer 24 controls the display of the second circular arc C2 in such a way that, on the one hand, its first end E'1 is aligned with the second point P2 and with the first end E1 of the first circular arc C1 and, on the other hand, its second end E'2 is aligned with the second point P2 and with the second end E2 of the first circular arc.

Figure 5:
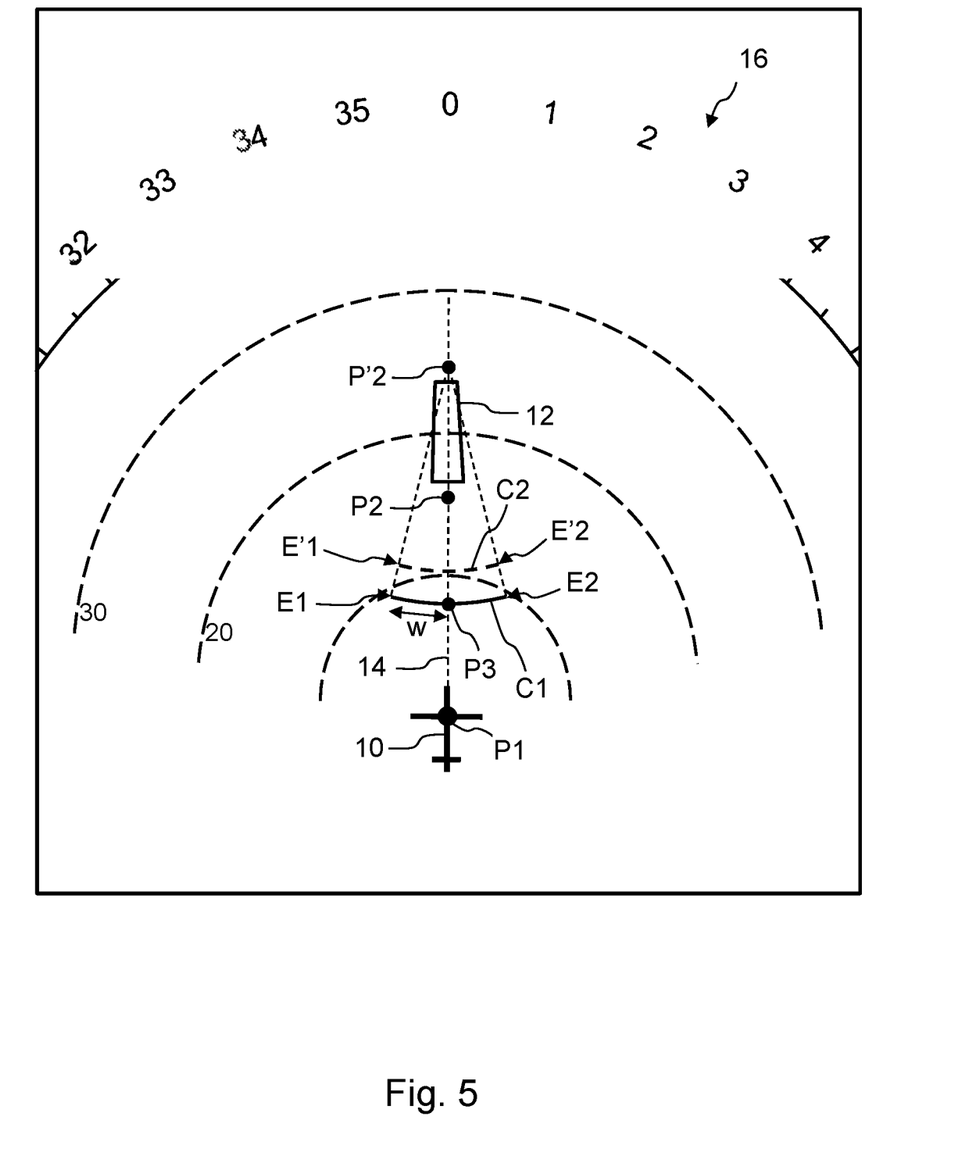

In another particular embodiment represented in FIG. 5, when the angle at the center of the first circular arc is greater than a predetermined angular value, the display management computer 24 controls the display of the first circular arc C1 according to a so-called compressed display mode. Such a situation occurs, in particular, when, for a given display scale ("range"), the aircraft is sufficiently close to the landing runway for the first approach distance, of which the radius of the first circular arc C1 is a function, is sufficiently small to result in an angle at the center of the first circular arc greater than a predetermined angular value. In this other particular embodiment, the display management computer 24 modifies the second point P2, by translation of the second point P2 along a straight line parallel to the longitudinal axis of the landing runway, over a translation distance in the planned direction of landing of the aircraft on the landing runway. The duly modified second point corresponds to the point P'2 in FIG. 5. The display management computer 24 controls the display of the first circular arc C1 centered on the duly modified second point P'2, the radius of the first circular arc corresponding to the radius that is a function of the first approach distance, augmented by the translation distance. The translation distance is determined in such a way that the angle at the center of the duly displayed first circular arc is less than or equal to the predetermined angular value. Performing the translation of the second point makes it possible to prevent the first circular arc C1 having an excessive curvature, even encircling the second point P2. The result thereof is thus a more ergonomic display of the first circular arc. The symmetry of the first circular arc C1 relative to the straight line (P1, P2) is thus more visible to the pilot of the aircraft, which improves his or her knowledge of the situation of the aircraft 10 relative to the landing runway 12. When the second circular arc C2 is displayed, as for the previous display modes, the display management computer 24 controls the display of the second circular arc C2 in such a way that, on the one hand, its first end E'1 is aligned with the second point P2 and with the first end E1 of the first circular arc C1 and, on the other hand, its second end E'2 is aligned with the second point P2 and with the second end E2 of the first circular arc.

Figure 7:
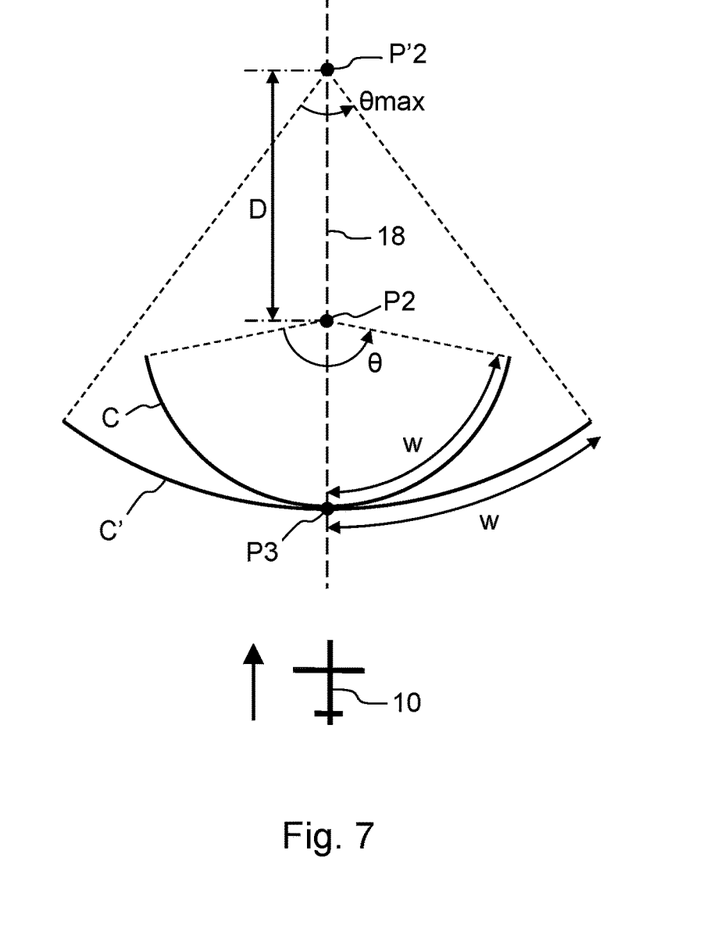
FIG. 7 is a detail view of FIG. 5.

An example of translation of the second point P2 to a modified second point P'2 is illustrated by FIG. 7. In this figure, a circular arc C, centered on the second point P2 and corresponding to the normal display mode, has an angle at the center of angular value θ. The circular arc C intersects the straight line (P1, P2) at the point P3. The approach distance of which the radius of the circular arc C is a function (equal to the distance between the second point P2 and the third point P3) is sufficiently small for the display of the circular arc C over a length w between the third point P3 and an end of the circular arc C results in a value of the angle at the center θ greater than the predetermined angular value θmax. The display management computer 24 modifies the second point P2, by translation of the second point P2 along a straight line 18 parallel to the longitudinal axis of the landing runway, over a translation distance D in the planned direction of landing of the aircraft on the landing runway. The translation of the second point P2 is thus effected to the modified second point P'2. Rather than control the display of the circular arc C, the display management computer 24 controls the display of a circular arc C' centered on the modified second point P'2 and which has for a radius the radius that is a function of the abovementioned approach distance, augmented by the translation distance D. By definition, like the circular arc C, the circular arc C' intersects the straight line (P1, P2) at the third point P3. In the example illustrated in the figure, the distance D is determined by the display management computer 24 in such a way that the display of the circular arc C' over a length w between the point P3 and an end of the circular arc C' results in a value of the angle at the center equal to the predetermined angular value θmax.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for aiding in piloting of an aircraft in an operational flight phase during which the aircraft is likely to land on a landing runway, the method comprising the steps of:
    a) determining current flight conditions of the aircraft;
    b) determining, by a processing unit, at least using the current flight conditions, a first approach distance which corresponds to a distance in a horizontal plane between projections in the horizontal plane of a current position of the aircraft and of a position of ground contact, and wherein the first approach distance is selected from a group consisting of:
        b1) a minimum approach distance in accordance with an optimized approach for achieving stabilized approach conditions; and,
        b2) a standard approach distance in accordance with a standard approach for achieving the stabilized approach conditions; and
    c) controlling, by a display management computer, a display on a navigation screen of a cockpit of the aircraft, of a first symbol associated with the first approach distance,
    wherein step c) comprises the following substeps:
        c1) determining the current position of the aircraft and selection of a first point, on the navigation screen of the cockpit, that is a function of the current position of the aircraft;
        c2) selecting a second point in proximity to the landing runway; and
        c3) controlling the display, on the navigation screen of the cockpit, of a first circular arc centered on the second point and whose radius is a function of the first approach distance, this first circular arc being such that the first circular arc intersects, at a third point, a straight line passing through the first point and through the second point and a length displayed on the navigation screen of a part of the first circular arc situated between the third point and a first end of the first circular arc corresponds to a predetermined length, the first circular arc corresponding to the first symbol,
    wherein steps a), b), and c) are performed successively, automatically, and repetitively.

2. The method according to claim 1, wherein:
    step b) also comprises determining, by the processing unit, a second approach distance, a first approach distance corresponding to said standard approach distance and the second approach distance corresponding to said minimum approach distance;

step c) further comprises controlling the display, on the navigation screen of the cockpit, of a second symbol associated with the second approach distance; and substep c3) further comprises controlling the display, on the navigation screen of the cockpit, of a second circular arc centered on the second point and whose radius is a function of the second approach distance, this second circular arc being such that the second circular arc intersects the straight line passing through the first point and through the second point and a first end of the second circular arc is aligned with the second point and with the first end of the first circular arc, and a second end of the second circular arc is aligned with the second point and with a second end of the first circular arc, the second circular arc corresponding to the second symbol.

3. The method according to claim 1, wherein the first point corresponds to:

the current position of the aircraft; or to an orthogonal projection of the current position of the aircraft on a straight line passing through a longitudinal axis of the landing runway.

4. The method according to claim 1, wherein the second point is chosen from:

a point of stabilization of the aircraft defined for an approach to the landing runway;

a point of start of final approach to the landing runway; and a threshold of the landing runway.

5. The method according to claim 1, wherein the display management computer controls the display of the first circular arc in such a way that the length displayed on the navigation screen of another part of said first circular arc situated between the third point and a second end of said first circular arc, opposite the first end, corresponds also to said predetermined length.

6. The method according to claim 1, wherein, when a distance between the current position of the aircraft determined in substep c 1) and the second point is less than the first approach distance:

substep c2) also comprises determining a fourth point defined in front of the aircraft and corresponding to an intersection of a current heading of the aircraft and a circle centered on the second point, this circle having for radius said radius that is a function of the first approach distance; and substep c3) further comprises the display management computer controlling the display of the first circular arc in such a way that the first circular arc intersects a straight line passing through the second point and through the fourth point.

7. The method according to claim 6, wherein, in substep c3), the display management computer controls the display of the first circular arc in such a way that the length displayed on the navigation screen of a part of the first circular arc situated between the fourth point and a second end of the first circular arc, opposite the first end, corresponds to said predetermined length.

8. The method according to claim 1, wherein, when an angle at a center of the first circular arc is greater than a predetermined angular value, substep c3) also comprises:

modifying the second point selected in substep c2), by translation of said second point along a straight line parallel to a longitudinal axis of the landing runway, over a translation distance in a direction of landing planned for the aircraft on the landing runway; and displaying the first circular arc centered on the duly modified second point, a radius of the first circular arc corresponding to said radius that is a function of the first approach distance, augmented by the translation distance, the translation distance being determined in such a way that the angle at the center of the duly displayed first circular arc is less than or equal to said predetermined angular value.

9. A system for aiding in piloting of an aircraft in an operational flight phase during which the aircraft is likely to land on a landing runway, this system comprising:

a processing unit of the aircraft configured to determine, at least using current flight conditions of the aircraft, a first approach distance which corresponds to distances in a horizontal plane between projections in the horizontal plane of a current position of the aircraft and of a position of ground contact, and wherein the first approach distance is selected from a group consisting of:

a minimum approach distance in accordance with an optimized approach for achieving stabilized approach conditions; and, a standard approach distance in accordance with a standard approach for achieving the stabilized approach conditions; and a display management computer configured to control a display, on a navigation screen of a cockpit of the aircraft, of a first symbol associated with the first approach distance, wherein at least one of the processing unit or the display management computer are configured to:

determining the current position of the aircraft and selecting a first point, on the navigation screen of the cockpit, that is a function of the current position of the aircraft; and selecting a second point in proximity to the landing runway, and wherein the display management computer is configured to control the display, on the navigation screen of the cockpit, of a first circular arc centered on the second point and whose radius is a function of the first approach distance, this first circular arc being such that the first circular arc intersects, at a third point, a straight line passing through the first point and through the second point and a length displayed on the navigation screen of a part of the first circular arc situated between the third point and a first end of the first circular arc corresponds to a predetermined length, the first circular arc corresponding to the first symbol.

10. The system according to claim 9, wherein:

the processing unit is also configured to determine a second approach distance, the first approach distance corresponding to said standard approach distance and the second approach distance corresponding to said minimum approach distance; and the display management computer is also configured to control the display, on the navigation screen of the cockpit, of a second symbol associated with the second approach distance, this second symbol corresponding to a second circular arc centered on the second point and whose radius is a function of the second approach distance, this second circular arc being such that the second circular arc intersects the straight line passing through the first point and through the second point and a first end of the second circular arc is aligned with the second point and with the first end of the first circular arc and a second end of the second circular arc is aligned with the second point and with a second end of the first circular arc.

11. The system according to claim 9, wherein the display management computer is configured to control the display of the first circular arc such that a length displayed on the navigation screen of another part of said first circular arc situated between the third point and a second end of said first circular arc, opposite the first end, corresponds also to said predetermined length.

12. The system according to claim 9, wherein:
the processing unit is also configured to determine whether a distance between the current position of the aircraft and the second point is less than the first approach distance and, when the distance between the current position of the aircraft and the second point is less than the first approach distance, to determine a fourth point defined in front of the aircraft and corresponding to an intersection of a current heading of the aircraft and a circle centered on the second point, this circle having for a radius said radius that is a function of the first approach distance; and
wherein the display management computer is configured to, when the distance between the current position of the aircraft and the second point is less than the first approach distance, further control the display of the first circular arc such that the first circular arc intersects a straight line passing through the second point and through the fourth point.

13. The system according to claim 9, wherein the display management computer is configured to determine whether an angle at a center of the first circular arc is greater than a predetermined angular value and, when the angle at the center of the first circular arc is greater than the predetermined angular value:
modify the second point, by translation of said second point along a straight line parallel to a longitudinal axis of the landing runway, over a translation distance in a landing direction planned for the aircraft on the landing runway; and
control the display of the first circular arc to be centered on the duly modified second point, the radius of the first circular arc corresponding to said radius that is a function of the first approach distance, augmented by the translation distance,
the translation distance being determined in such a way that the angle at the center of the duly displayed first circular arc is less than or equal to said predetermined angular value.

14. An aircraft comprising a piloting aid system according claim 9.

* * * * *